(12) United States Patent
Guha et al.

(10) Patent No.: US 8,373,758 B2
(45) Date of Patent: Feb. 12, 2013

(54) TECHNIQUES FOR ANALYZING PERFORMANCE OF SOLAR PANELS AND SOLAR CELLS USING INFRARED DIAGNOSTICS

(75) Inventors: Supratik Guha, Yorktown Heights, NY (US); Yves C. Martin, Yorktown Heights, NY (US); Robert L. Sandstrom, Yorktown Heights, NY (US); Theodore Gerard van Kessel, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 12/616,683

(22) Filed: Nov. 11, 2009

(65) Prior Publication Data

US 2011/0109740 A1  May 12, 2011

(51) Int. Cl.
    *H04N 5/33* (2006.01)
(52) U.S. Cl. .......................... 348/164; 348/152; 250/330
(58) Field of Classification Search .................. 348/143, 348/152, 164; 250/330–333
    See application file for complete search history.

(56) References Cited

U.S. PATENT DOCUMENTS

| | | | | |
|---|---|---|---|---|
| 6,606,115 | B1 * | 8/2003 | Alicandro et al. | 348/164 |
| 6,926,440 | B2 | 8/2005 | Litwin | |
| 7,321,303 | B2 * | 1/2008 | Chen | 348/152 |
| 7,457,441 | B2 * | 11/2008 | Hartlove | 382/117 |
| 2002/0128797 | A1 * | 9/2002 | Sun | 702/172 |
| 2003/0122077 | A1 | 7/2003 | Kaufman et al. | |
| 2003/0128130 | A1 * | 7/2003 | Kao | 348/152 |
| 2003/0146975 | A1 * | 8/2003 | Joung et al. | 348/164 |
| 2004/0208499 | A1 * | 10/2004 | Grober | 396/428 |
| 2005/0252545 | A1 | 11/2005 | Nowlan et al. | |
| 2007/0034798 | A1 * | 2/2007 | Hamrelius et al. | 250/332 |
| 2007/0181180 | A1 * | 8/2007 | Chou et al. | 136/290 |
| 2008/0028846 | A1 | 2/2008 | Heath et al. | |
| 2009/0010493 | A1 * | 1/2009 | Gornick et al. | 382/103 |
| 2009/0232506 | A1 | 9/2009 | Hudson et al. | |
| 2009/0238444 | A1 * | 9/2009 | Su et al. | 382/149 |
| 2011/0001809 | A1 * | 1/2011 | McManus et al. | 348/164 |

FOREIGN PATENT DOCUMENTS

JP  03172747  7/1991

OTHER PUBLICATIONS

J.P. Boyeaux et al., "Correlated Light Beam Induced Current and Infrared Thermography Mapping Applied to the Local Characterization of Large Area Multicrystalline Solar Cells," Photovoltaic Specialists Conference, 2000, Conference Record of the twenty-Eighth IEEE, pp. 319-322 (Sep. 15-22, 2000).

(Continued)

*Primary Examiner* — Bharat N Barot
(74) *Attorney, Agent, or Firm* — Vazken Alexanian; Michael J. Chang, LLC

(57) ABSTRACT

Techniques for analyzing performance of solar panels and/or cells are provided. In one aspect, a method for analyzing an infrared thermal image taken using an infrared camera is provided. The method includes the following steps. The infrared thermal image is converted to temperature data. Individual elements are isolated in the infrared thermal image. The temperature data for each isolated element is tabulated. A performance status of each isolated element is determined based on the tabulated temperature data. The individual elements can include solar panels and/or solar cells. In another aspect, an infrared diagnostic system is provided. The infrared diagnostic system includes an infrared camera which can be remotely positioned relative to one or more elements to be imaged; and a computer configured to receive thermal images from the infrared camera, via a communication link, and analyze the thermal images.

16 Claims, 6 Drawing Sheets

OTHER PUBLICATIONS

W. Gross et al., "Thermosensoric Localization of Defects in CIS Solar Modules," Photovoltaic Specialists Conference, 1997, Conference Record of the Twenty-Sixth IEEE, pp. 551-554 (Sep. 29-Oct. 3, 1997).

"Usage of IR Camera for Performance Improvement of Photovoltaic Generators," IPCOM000177506D (2008).

D.L. King et al., "Applications for Infrared Imaging Equipment in Photovoltaic Cell, Module, and System Testing," Photovoltaic Specialists Conference, 2000, Conference Record of the twenty-Eighth IEEE, pp. 1487-1490 (Sep. 15-22, 2000).

Solar Cell Development—FLIR Solution Series http://www.flir.com/uploadedFiles/Thermography_USA/Industries/Application_Stories/SolarCell_Development.pdf.

* cited by examiner

*FIG.* 9
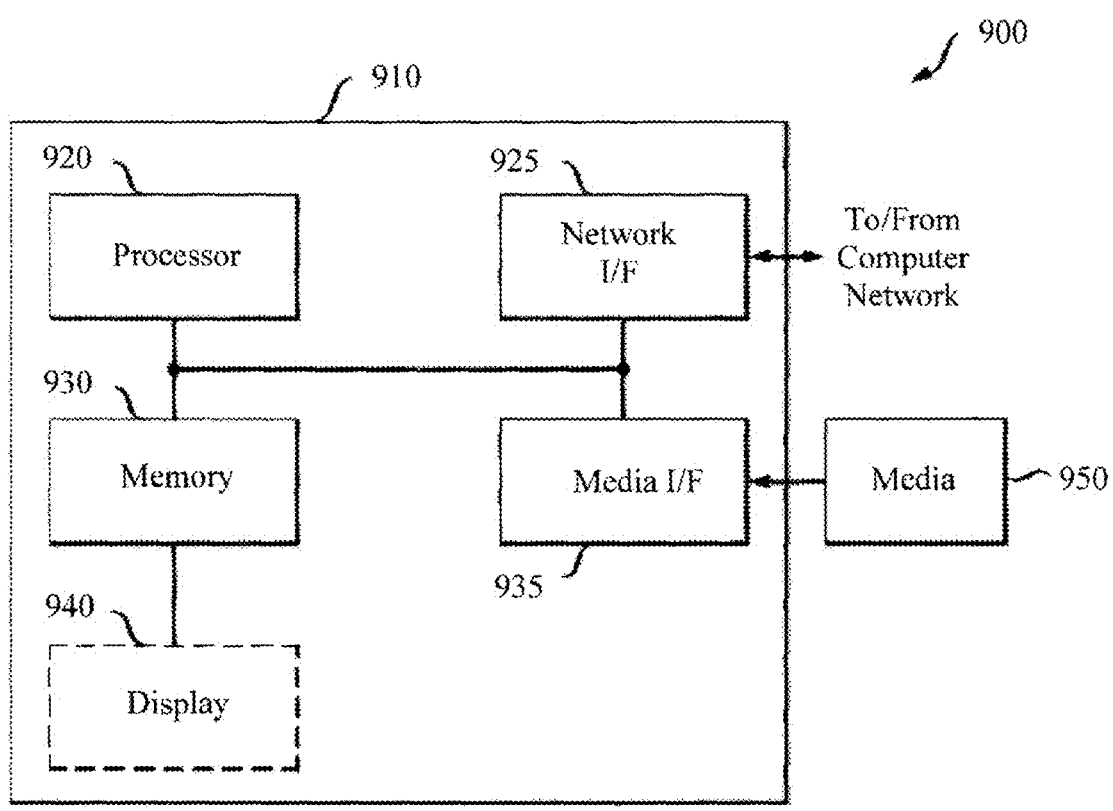

TECHNIQUES FOR ANALYZING PERFORMANCE OF SOLAR PANELS AND SOLAR CELLS USING INFRARED DIAGNOSTICS

FIELD OF THE INVENTION

The present invention relates to solar technology, and more particularly, to techniques for analyzing performance of solar panels and/or cells.

BACKGROUND OF THE INVENTION

Solar photovoltaic arrays occupy large areas and are made up of many individual solar panels. For example, a 10 megawatt (MW) array might contain 50,000 individual panels. Each panel includes many individual solar cells wired together. Panels are wired to allow for continuing operation in the presence of individual cell failures. Solar arrays are further wired to allow strings of panels to continue operation in the presence of individual panel failures.

Therefore, given such a fault-tolerant wiring system, techniques for identifying failures at the cell and at the panel level, for example, in order schedule maintenance and swap out of failed components, would be desirable.

SUMMARY OF THE INVENTION

The present invention provides techniques for analyzing performance of solar panels and/or cells. In one aspect of the invention, a method for analyzing an infrared thermal image taken using an infrared camera is provided. The method includes the following steps. The infrared thermal image is converted to temperature data. Individual elements are isolated in the infrared thermal image. The temperature data for each isolated element is tabulated. A performance status of each isolated element is determined based on the tabulated temperature data. The individual elements can include solar panels and/or solar cells.

In another aspect of the invention, an infrared diagnostic system is provided. The infrared diagnostic system includes an infrared camera which can be remotely positioned relative to one or more elements to be imaged; and a computer configured to receive thermal images from the infrared camera, via a communication link, and analyze the thermal images.

A more complete understanding of the present invention, as well as further features and advantages of the present invention, will be obtained by reference to the following detailed description and drawings.

BRIEF DESCRIPTION OF THE DRAWINGS

FIG. 9 is a diagram illustrating an exemplary apparatus for analyzing an infrared thermal image taken using an infrared camera according to an embodiment of the present invention.

DETAILED DESCRIPTION OF PREFERRED EMBODIMENTS

Disclosed herein are techniques for testing solar panels and/or solar cells in the field without interrupting operation. The present techniques are based on the observation made herein that a working panel and/or cell dissipates a portion of an absorbed radiant heat load as electric power (that is supplied, e.g., to a power grid), whereas a non-working panel and/or cell must dissipate all of an absorbed radiant heat load as heat. Therefore, a working panel or cell will be cooler than a counterpart non-working panel or cell by several degrees.

Figure 1:
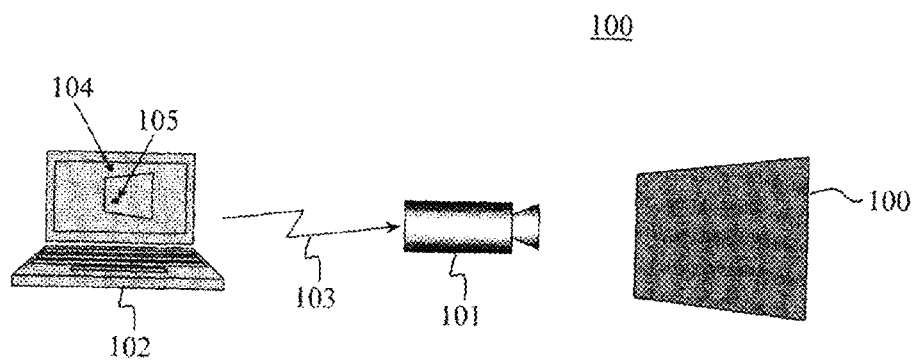
FIG. 1 is a diagram illustrating an exemplary infrared diagnostic system according to an embodiment of the present invention.

In one embodiment of the present techniques, an infrared diagnostic system is provided having an infrared camera and a computing system to remotely observe spatial temperature variations of individual panels to determine operating conditions of the individual panels, and of the cells making up the individual panels. Specifically, FIG. 1 is a diagram illustrating exemplary infrared diagnostic system 100. Infrared diagnostic system 100 includes an infrared camera 101 and a computer 102 configured to communicate with one another via a communication link 103. As will be described in detail below, infrared camera 101 can be remotely positioned relative to one or more elements (e.g., solar panels and/or solar cells) to be imaged, for example, by way of a remotely controllable pan/tilt capabilities and/or by way of a remotely controllable mobile vehicle and/or platform to which infrared camera 101 is attached.

As shown in FIG. 1, during an exemplary performance of an imaging process (described in further detail below) infrared camera 101 is oriented to image a solar panel 100 and transfer the (thermal) image data to computer 102 via communication link 103. Computer 102 may be embodied in an apparatus such as apparatus 900 described in conjunction with the description of FIG. 9, below. A defective cell is illustrated in FIG. 1 as a distinct hot region 105 in thermal image 104 of solar panel 100.

According to an exemplary embodiment, infrared camera 101 has a pixel resolution of at least about 240 pixels×320 pixels, a thermal accuracy of two degrees centigrade or two percent (%), a thermal sensitivity of less than about 0.1 degrees centigrade and an operating power requirement of about 25 watts (W) for battery-driven applications.

Communication link 103 can include any suitable connection that permits the exchange of control and image data between infrared camera 101 and computer 102. By way of example only, communication link 103 can be a wired or wireless communication link. Therefore, by way of example only, when infrared camera 101 is affixed to a mobile vehicle, such as a ground or air vehicle (see below), communications between infrared camera 101 and computer 102 can occur wirelessly. Thus, in this example, computer 102 does not have to be located on the mobile vehicle along with infrared camera 101.

As highlighted above, solar photovoltaic arrays are made up of many individual solar panels, each solar panel including many individual solar cells wired together. Infrared camera 101 is positioned relative to solar panel 100 such that a region(s) of interest can be imaged by infrared camera 101. According to an exemplary embodiment, this region(s) of interest includes an area of one or more cells and extends to areas containing many panels according to the measurement being performed.

Positioning of infrared camera 101 relative to solar panel 100 can be achieved by any one of a number of ways. By way of example only, infrared camera 101 can be held/placed in front of solar panel 100, attached to a post or other mechanical support with positioning capability (such as pan and tilt) or placed in a ground or air vehicle which allows repositioning by direct or remote means. For instance, in one exemplary embodiment infrared camera 101 is equipped with a zoom lens and permanently fixed to a static mechanical mount, i.e., support post. Infrared camera 101 preferably has remote pan and tilt capability (see, for example, FIG. 2, described below). The camera, lens and positioning devices are remotely operable to allow desired portion(s) of solar panel 100 to be imaged. In another exemplary embodiment, the infrared camera is affixed to a ground vehicle that is capable of remotely positioning the camera relative to the solar panels to observe the desired portion of a solar array (see, for example, FIG. 7, described below). In this example, remote pan and tilt capabilities are preferred (see below). In yet another exemplary embodiment, the infrared camera is affixed to an air vehicle that is capable of remotely positioning the camera relative to the solar panels to observe the desired portion of a solar array (see, for example, FIG. 8, described below). In this example, remote pan and tilt capabilities are preferred (see below).

Figure 2:
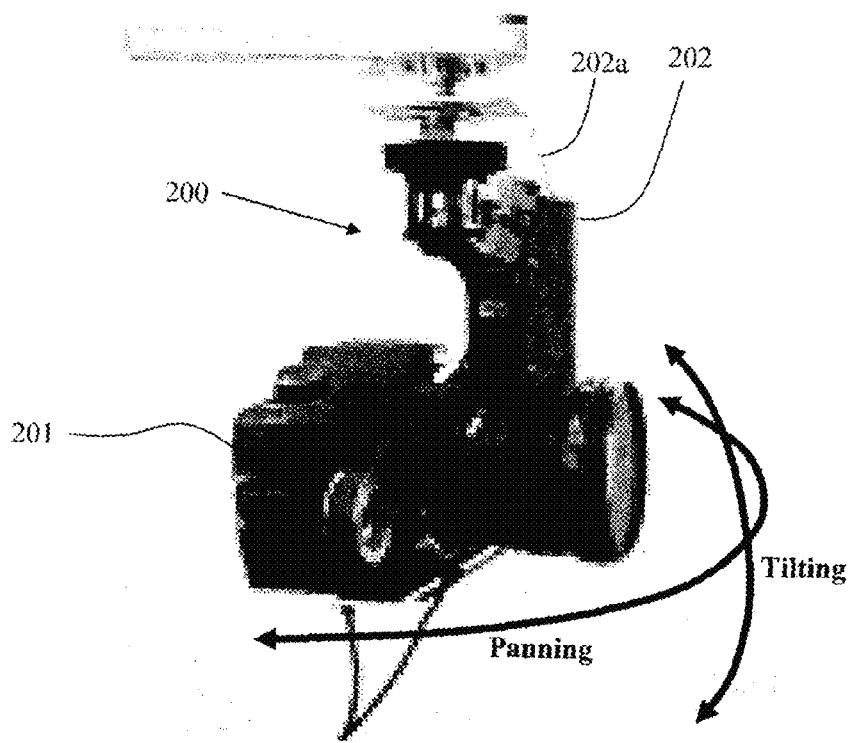
FIG. 2 is a diagram illustrating a mechanical support for an infrared camera that has remote positioning capability such as pan and tilt, as well as remote lens operation such as a remotely operable imaging zoom lens according to an embodiment of the present invention.

FIG. 2 is a diagram illustrating a mechanical support 200 for an infrared camera 201 that has remote positioning capability such as pan (rotation in a horizontal plane) and tilt (rotation in a vertical plane), as well as remote lens operation and adjustment capabilities, such as a remotely operable imaging zoom lens. The remote operation of the positioning of mechanical support 200 is accomplished through one or more actuators (not shown), e.g., electric servos, within a control module 202. Control module 202 can be controlled wirelessly by way of signals transmitted to antenna 202a. The wireless remote operation of actuators in general is known those of skill in the art and thus this aspect is not described further herein.

As described above, it is observed herein that a working solar panel and/or cell dissipates a portion of the absorbed radiant heat load as electric power. The operating solar panel or cell is cooler by several degrees relative to a non-working cell which must dissipate all if its absorbed radiant power as heat.

Figure 3:
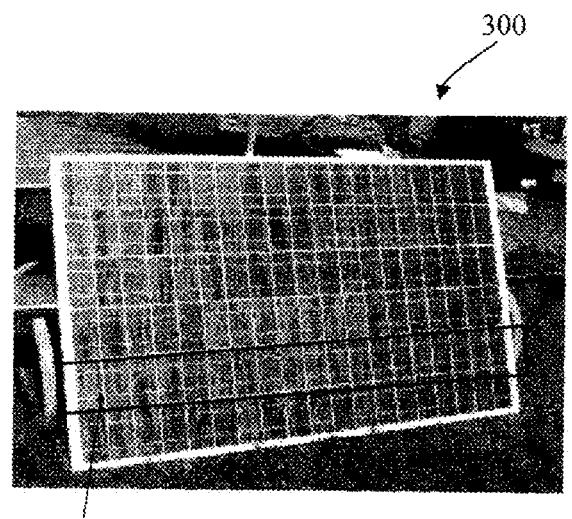
FIG. 3 is an image of a solar flat panel containing a purposely disabled row of cells according to an embodiment of the present invention.

FIG. 3 is an image of a solar flat panel 300 containing a purposely disabled row of cells whose location on the visible image is identified by region 301. Solar panel 300 will be used to illustrate the present techniques.

Figure 4:
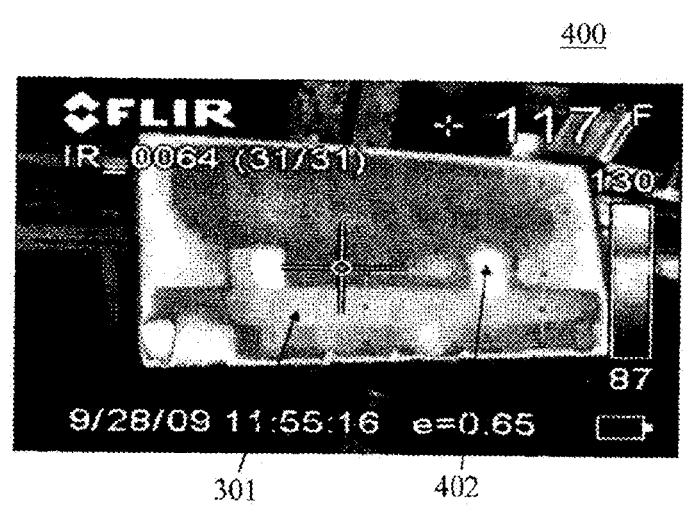
FIG. 4 is an infrared thermal image of the solar flat panel of FIG. 3 in operation taken using the infrared diagnostic system of FIG. 1 according to an embodiment of the present invention.

FIG. 4 is an infrared thermal image 400 of solar flat panel 300 (of FIG. 3) in operation taken (captured) using infrared diagnostic system 100 (of FIG. 1). The disabled row of cells in region 301 is visible in the thermal image 400. In addition to the disabled row, the thermal image of a defective cell 402 operating at high temperature is shown in thermal image 400. This "hot cell" is made more visible by the row failure since adjacent regions are warmer and do not offer a conduction path for heat to escape.

Figure 5:
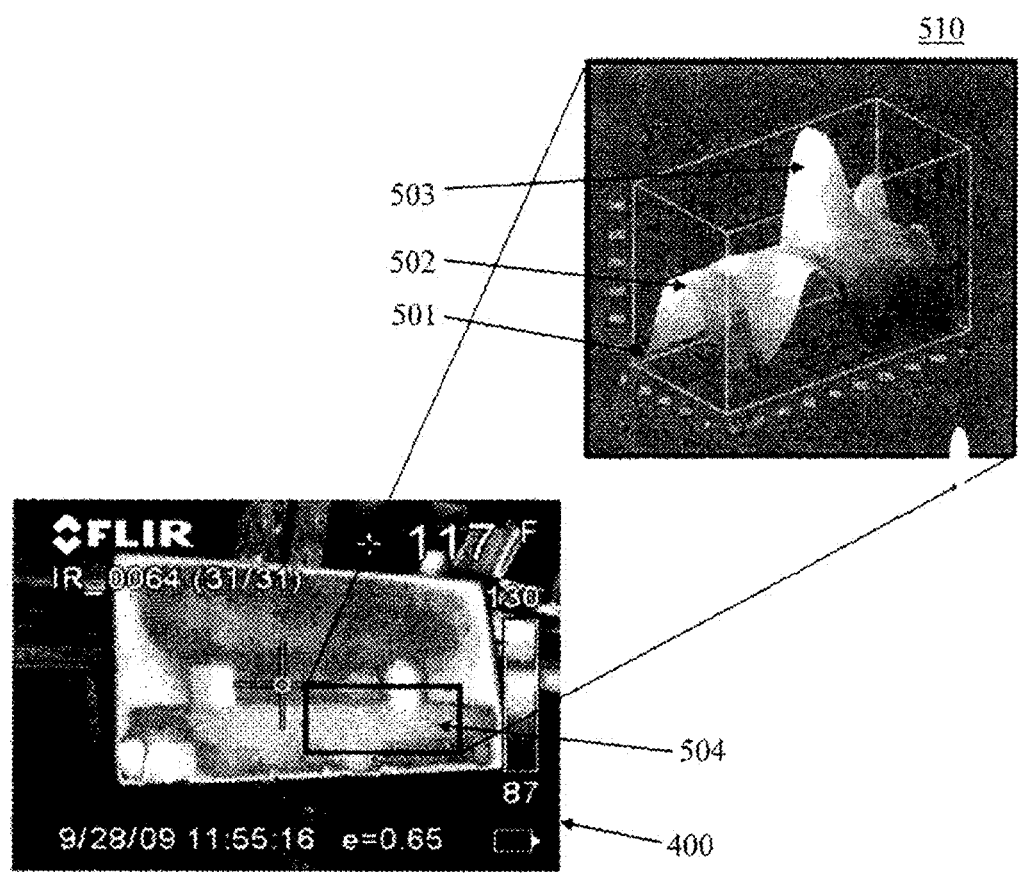
FIG. 5 is a diagram illustrating how an amplitude plot can be used to analyze a region of interest in an infrared image according to an embodiment of the present invention.

FIG. 5 is a diagram illustrating how an amplitude plot can be used to analyze a region of interest in an infrared image. Specifically, included in FIG. 5 is an amplitude plot 510 of a region of interest 504 in infrared thermal image 400 (of FIG. 4) of a solar panel. From plot 510, a temperature level 501 of operating cells can be compared to a temperature level 502 of cells in the inoperative row and to a temperature level 503 of the failing cell. Plot 510 clearly shows that an amplitude difference of three to four degrees is clearly distinguishable relative to the noise in the signal and other image features. This amplitude (temperature difference) between a given cell or panel and an adjacent cell or panel allows one to infer that the cell or panel has failed.

Figure 6:
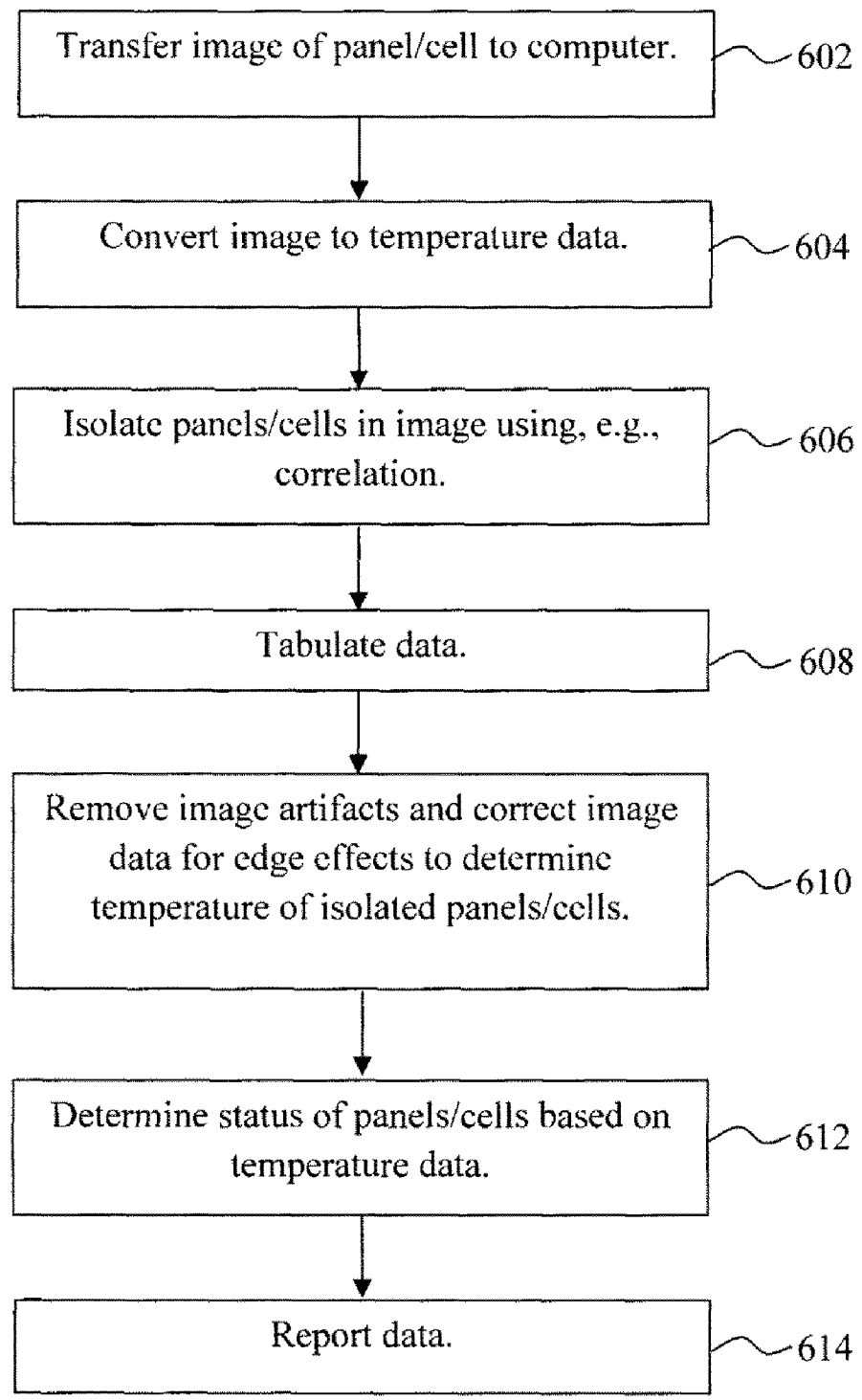
FIG. 6 is a diagram illustrating an exemplary methodology for analyzing an infrared thermal image according to an embodiment of the present invention.

Once an infrared thermal image is acquired (captured) as described above, analysis of the panel(s) imaged can be performed in several ways. FIG. 6 is a diagram illustrating exemplary methodology 600 for analyzing an infrared thermal image using, for example, infrared diagnostic system 100 of FIG. 1. The following description will focus on an example where the infrared thermal image taken is of a group of solar panels. However, the same analysis is applicable to infrared thermal images at various other scales, such as infrared thermal images of individual panels and/or individual cells within a panel(s) (see below).

In step 602, the infrared thermal image of the panels is transferred from the infrared camera (i.e., infrared camera 101) to the computer (i.e., computer 102). As highlighted above, the computer may be embodied in an apparatus such as apparatus 900 described in conjunction with the description of FIG. 9, below. The term "infrared thermal image," as used herein, refers to an image made up of temperature data, wherein a pixel value in the image represents the temperature at a physical point in space imaged onto the sensing element of the infrared camera.

In step 604, once the infrared thermal image is received by the computer, the infrared thermal image is converted to temperature data (if not already converted by the infrared camera, see below). This conversion may be done by the application of a mathematical formula that relates the raw sensing element (of the infrared camera) data in watts to a thermal value using a known emissivity value. Alternatively, the infrared thermal image can optionally be converted to temperature data by the infrared camera itself, rather than through the use of the computer. As will be described in detail below, the temperature data will be used to analyze performance of the subject panel or panels. The analysis presented herein includes the systematic application of data conditioning and analysis procedures to extract the desired diagnostic information. According to an exemplary embodiment, information relating to performance of a group of solar panels, performance of individual solar panels and/or performance of individual solar cells within a panel is extracted from the raw infrared thermal images.

In step 606, individual panels are isolated, i.e., identified and bounded, in the infrared thermal image taking into account such factors as basic panel dimensions, orientation, cell dimension and orientation (see below). These isolated panels in the infrared thermal image may also be referred to herein generically as "elements" so as to generally include reference to panels and cells (see below), i.e., the elements are thermal images of a solar panel(s) and/or of a solar cell(s). Step 606 can be performed manually or can be automated (i.e., performed by the computer). Specifically, in the simplest case, regions of the thermal image corresponding to panels or cells are identified in the image manually by placing a cursor at corner points of rectangular image regions. Alternately, this step can be automated (i.e., performed by the computer) using blob finding techniques with constraints or autocorrelation techniques with constraints. These techniques and the implementation thereof are known to those of skill in the art and thus they are not described further herein. Emissivity, thermal resistance, ambient temperature, wind velocity and insolation may also be entered into the analysis as input. Emissivity is a measure of energy emitted by a particular object as compared to energy emitted by a black body at the same temperature. Emissivity is usually expressed as a ratio of these two energy values. Insolation refers to the amount of solar energy that is incident on an area per unit time.

According to an exemplary embodiment, the infrared thermal image is first processed to identify rectangular features (i.e., rectangular regions of the infrared thermal image that correspond to individual elements (panels and/or cells)) and individual panel boundaries therein. Additionally, individual cells can be identified within panels if the analysis is to be conducted at the cell level (see below). Rectangular regions can be isolated using computer-based techniques that are known to those of skill in the field of image processing. These image processing techniques include, but are not limited to, correlation and Hough transforms. Edges of panels or cells in the thermal image can be enhanced by finite impulse response filtration and similar methods to simplify edge isolation and rectangular region isolation. In cases where the panel or cells are viewed at an angle, the relative angular orientation of a panel can be determined by edge angles. The thermal image data can then be re-sampled using warp techniques to provide an image that appears orthogonal (rectangular in appearance). This step allows all panels or cells to be processed in the same manner below.

In step 608, the temperature data (see step 604, described above) for each panel that was isolated (identified and bounded) in step 606 is tabulated. In the simplest case, a mean or median value is useful for this. For example, the mean or median of the temperature values within each isolated panel can be determined. As described above, a pixel value in the infrared thermal image represents the temperature at a physical point in space (e.g., at a point within an isolated panel). Thus, the mean or median of the temperature values of these pixels within a given isolated panel can be determined. The process for determining a mean or median of a plurality of temperature values would be apparent to one of skill in the art and thus is not described further herein. Other more intricate calculations for tabulating the temperature data for each isolated panel, such as use of a baseline function (see description of step 610, below), can be employed to obtain a more accurate representation of panel temperature.

At this point in the process, in step 610, corrections can be applied that take into account the thermal behavior of the panel with respect to cooling. For example, a top of a panel may be hotter than a bottom of the same panel due to wind. However, without the wind, the top and bottom of the panels would register the same temperature. Thus, the wind effect, if not accounted for, might give false readings. By examining the top to bottom temperature difference, this difference can be subtracted out of the data to remove edge effects and related artifacts from the data and reduce the data to an effective panel temperature. As highlighted above, these corrections can be implemented to gain a more accurate representation of panel temperature (i.e., as compared to simply calculating the mean or median panel temperature). According to one exemplary embodiment, a baseline function is computed for a given rectangular region corresponding to a panel (or cell, see below) in the infrared thermal image, that in its simplest form comprises a splined estimate of the median temperature of the panel across its surface. According to another exemplary embodiment, a more involved estimate for panel temperature tabulation includes applying a thermal model to the panel that takes into account the thermal resistance of the panel, orientation (including height off of the ground), wind velocity and insolation. It would be apparent to one of skill in the art how to take these factors into account when tabulating panel temperature. In either case, the baseline function is a reference against which the temperature data is compared and corresponds to an expected temperature of the panel.

The baseline can be computed for a single panel in order to isolate individual cell variations (see below). Further, the baseline can be computed for a plurality of panels and merged to a median baseline. This alternate means of analysis allows comparison of corresponding areas of one panel relative to other panels in the same array at the same time to establish relative performance.

Areas of the panel that are at a lower temperature relative to the baseline function are dumping more of their heat in the form of electricity relative to areas that have a higher temperature relative to the baseline function. If the baseline function is computed with sufficient care, the efficiency of a given panel or cell can be computed.

Specifically, in step 612, a performance status of each identified, i.e., isolated, panel is determined. The term "performance," as used herein, refers to an efficiency with which a given element (a panel or cell) is converting incident solar power to electricity and delivering it to the load (load means grid, that which dissipates energy in the form of electricity in this case). Performance can be inferred, for example, by comparing the temperature of the panel to adjacent known working panels and/or by comparing an absolute temperature of the panel to a model that takes into account factors, such as insolation and wind, to determine an expected temperature of the panel in operation. In either case, a positive temperature difference indicates that performance of the panel is degraded or failed. According to an exemplary embodiment, the performance status of each panel can be one of operational (panel is performing according to manufacturer specifications), degraded (performance is less than optimal, although the panel is still to some extent functional) or failure (panel is no longer operational).

The steps of methodology 600 can be performed at certain, regular intervals. Based on the performance evaluation, a decision can then be made as to whether to replace a given panel immediately, or wait for the next evaluation cycle. By way of example only, if a given panel shows degraded performance at one performance testing cycle (i.e., during one iteration of methodology 600), then an operator may decide to either replace the panel at that time, or wait to see if the performance of the panel is further degraded during the next iteration of methodology 600.

To permit such a determination, in step 614, a report is generated to summarize the analysis (i.e., to give the performance status of each isolated panel). Any suitable form of data reporting can be used to convey the performance status to an operator, including, but not limited to numerical and/or graphical representations.

Analysis of individual cells within a working panel can be analyzed in a similar manor to the analysis above. In this case, an image is taken of a panel or portion of a panel with sufficient pixel resolution to image individual cells with at least one pixel. In practice, a plurality of pixels per cell (i.e., greater than 100 pixels) is desirable.

Individual cells within the thermal image are then isolated as described in conjunction with the description of step 606 above and temperature data associated with each isolated cell is tabulated as described in conjunction with the description of step 608, above. Individual cell data is compensated for edge and structure cooling effects, camera artifacts, etc. as described in conjunction with the description of step 610, above.

The performance status of the individual cells is estimated by comparing the cell temperature to adjacent cells and evaluation of a cell theoretical temperature model as described in conjunction with the description of step 612, above, and the data is reported as described in conjunction with the description of step 614, above.

Figure 7:
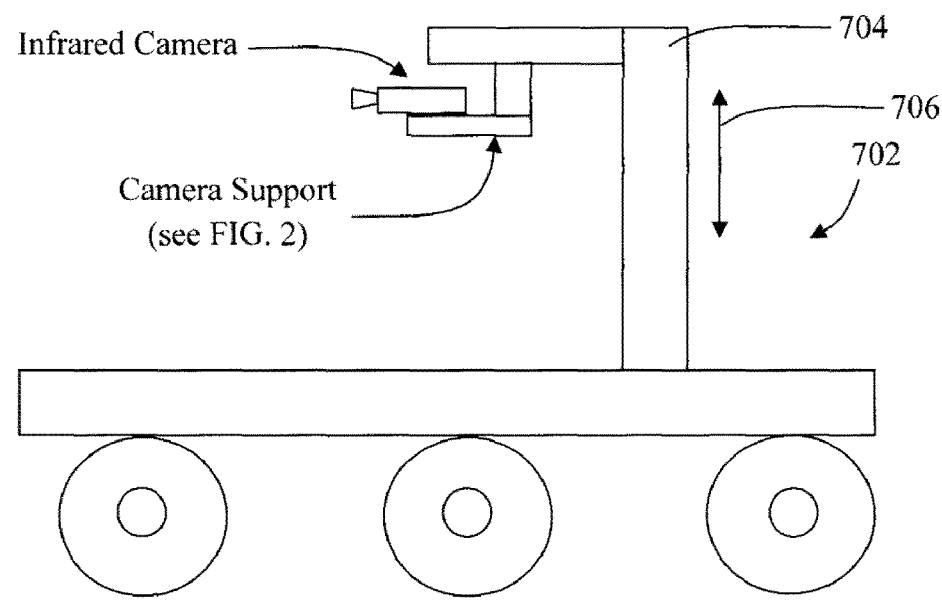
FIG. 7 is a diagram illustrating an infrared camera affixed to a ground vehicle according to an embodiment of the present invention.

FIG. 7 is a diagram illustrating an infrared camera (e.g., infrared camera 101 of infrared diagnostic system 100) affixed to a ground vehicle 702 (which can be any type of ground vehicle capable of remotely positioning the infrared camera relative to solar panels to observe a desired portion of a solar array) by a mechanical support, such as mechanical support 200 of FIG. 2 with remote pan and tilt capabilities, described above. In one exemplary embodiment, ground vehicle 702 is a simple wheeled platform with a telescoping mast to hold the infrared camera and remotely operable pan tilt mechanism. In an alternate embodiment, the wheeled platform is replaced with self-propelled battery powered remotely controlled motorized cart. In one embodiment, a remote control comprises a manually operated control connected to the controlled device by wire or wireless means. According to the exemplary embodiment shown illustrated in FIG. 7, ground vehicle 702 includes a mast 704 to which the infrared camera is attached. Preferably, the mast has telescoping capabilities (as indicated by arrow 706) which permit the infrared camera to be raised or lowered to gain optimal access to the panels being imaged. Control of the mast is preferably remote as well, but could also be manual.

Figure 8:
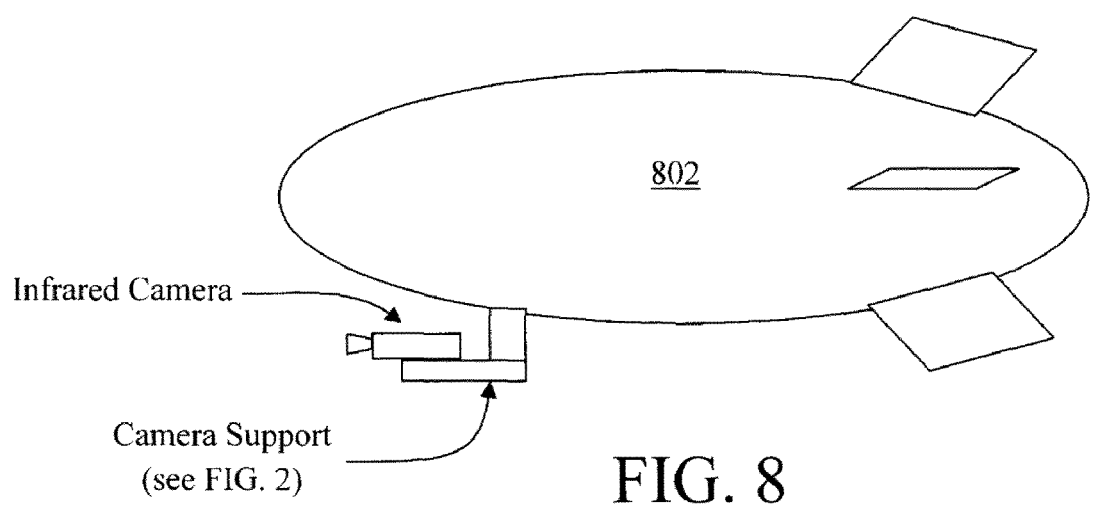
FIG. 8 is a diagram illustrating an infrared camera affixed to an air vehicle according to an embodiment of the present invention.

FIG. 8 is a diagram illustrating an infrared camera (e.g., infrared camera 101 of infrared diagnostic system 100) affixed to an air vehicle 802 (which can be any type of air vehicle capable of remotely positioning the infrared camera relative to solar panels to observe a desired portion of a solar array) by a mechanical support, such as mechanical support 200 of FIG. 2 with remote pan and tilt capabilities, described above. In a preferred embodiment, the infrared camera configured with wireless remote control (see above) is affixed to an airship also with remote wireless control. In this embodiment, the airship is a small helium filled blimp of approximately eight cubic meters (m$^3$) volume and a one kilogram (kg) payload with directional control by way of electric motor-driven propellers and self-powered from a small storage battery.

Turning now to FIG. 9, a block diagram is shown of an apparatus 900 for analyzing an infrared thermal image taken using an infrared camera, in accordance with one embodiment of the present invention. It should be understood that apparatus 900 represents one embodiment for implementing methodology 600 of FIG. 6 and may serve as computer 102 of the infrared diagnostic system of FIG. 1.

Apparatus 900 comprises a computer system 910 and removable media 950. Computer system 910 comprises a processor device 920, a network interface 925, a memory 930, a media interface 935 and an optional display 940. Network interface 925 allows computer system 910 to connect to a network, while media interface 935 allows computer system 910 to interact with media, such as a hard drive or removable media 950.

As is known in the art, the methods and apparatus discussed herein may be distributed as an article of manufacture that itself comprises a machine-readable medium containing one or more programs which when executed implement embodiments of the present invention. For instance, the machine-readable medium may contain a program configured to convert the infrared thermal image to temperature data; isolate individual elements in the infrared thermal image; tabulate the temperature data for each isolated element; and determine a performance status of each isolated element based on the tabulated temperature data.

The machine-readable medium may be a recordable medium (e.g., floppy disks, hard drive, optical disks such as removable media 950, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 920 can be configured to implement the methods, steps, and functions disclosed herein. The memory 930 could be distributed or local and the processor device 920 could be distributed or singular. The memory 930 could be implemented as an electrical, magnetic or optical memory, or any combination of these or other types of storage devices. Moreover, the term "memory" should be construed broadly enough to encompass any information able to be read from, or written to, an address in the addressable space accessed by processor device 920. With this definition, information on a network, accessible through network interface 925, is still within memory 930 because the processor device 920 can retrieve the information from the network. It should be noted that each distributed processor that makes up processor device 920 generally contains its own addressable memory space. It should also be noted that some or all of computer system 910 can be incorporated into an application-specific or general-use integrated circuit.

Optional video display 940 is any type of video display suitable for interacting with a human user of apparatus 900. Generally, video display 940 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A computer-implemented method for analyzing an infrared thermal image taken using an infrared camera, comprising the steps of:
    converting the infrared thermal image to temperature data;
    isolating individual elements in the infrared thermal image, wherein the individual elements are selected from the group consisting of: multiple solar panels in operation and multiple solar cells in operation;
    tabulating the temperature data for each isolated element; and
    determining a performance status of each isolated element based on the tabulated temperature data by examining temperature differences between the individual elements to determine whether one or more of the individual elements has failed,
    wherein at least one of the steps is carried out using a computer device.

2. The method of claim 1, wherein the isolating step further comprises the step of:
    identifying rectangular regions of the infrared thermal image that correspond to the individual elements.

3. The method of claim 1, wherein the tabulating step further comprises the step of:
    determining a mean value of the temperature data for each of the isolated elements.

4. The method of claim 1, wherein the tabulating step further comprises the step of:
    determining a median value of the temperature data for each of the isolated elements.

5. The method of claim 1, further comprising the step of:
    generating a report of the performance status of each of the isolated elements.

6. A non-transitory article of manufacture for analyzing an infrared thermal image taken using an infrared camera, comprising a non-transitory machine-readable medium containing one or more programs which when executed implement the steps of:
    converting the infrared thermal image to temperature data;
    isolating individual elements in the infrared thermal image, wherein the individual elements are selected from the group consisting of multiple solar panels in operation and multiple solar cells in operation;
    tabulating the temperature data for each isolated element; and
    determining a performance status of each isolated element based on the tabulated temperature data by examining temperature differences between the individual elements to determine whether one or more of the individual elements has failed.

7. An apparatus for analyzing an infrared thermal image taken using an infrared camera, the apparatus comprising:
    a memory; and
    at least one processor device, coupled to the memory, operative to:
        convert the infrared thermal image to temperature data;
        isolate individual elements in the infrared thermal image, wherein the individual elements are selected from the group consisting of multiple solar panels in operation and multiple solar cells in operation;
        tabulate the temperature data for each isolated element; and
        determine a performance status of each isolated element based on the tabulated temperature data by examining temperature differences between the individual elements to determine whether one or more of the individual elements has failed.

8. An infrared diagnostic system, comprising:
    an infrared camera which can be remotely positioned relative to one or more elements to be imaged; and
    a computer configured to receive thermal images from the infrared camera, via a communication link, and analyze the thermal images, comprising the steps of:
    converting the infrared thermal image to temperature data;
    isolating individual elements in the infrared thermal image, wherein the individual elements are selected from the group consisting of multiple solar panels in operation and multiple solar cells in operation;
    tabulating the temperature data for each isolated element; and
    determining a performance status of each isolated element based on the tabulated temperature data by examining temperature differences between the individual elements to determine whether one or more of the individual elements has failed.

9. The infrared diagnostic system of claim 8, wherein the infrared camera has a pixel resolution of at least about 240 pixels×320 pixels.

10. The infrared diagnostic system of claim 8, wherein the communication link is a wireless communication link.

11. The infrared diagnostic system of claim 8, wherein the infrared camera has remotely controllable pan and tilt capabilities.

12. The infrared diagnostic system of claim 8, wherein the infrared camera has remotely controllable lens adjustment capabilities.

13. The infrared diagnostic system of claim 8, further comprising:
    a remotely controllable air ship to which the infrared camera is mounted.

14. The infrared diagnostic system of claim 13, wherein the infrared camera has remotely controllable pan and tilt capabilities and remotely controllable lens adjustment capabilities.

15. The infrared diagnostic system of claim 8, further comprising:
    a remotely controllable ground vehicle to which the infrared camera is mounted.

16. The infrared diagnostic system of claim 15, wherein the infrared camera has remotely controllable pan and tilt capabilities and remotely controllable lens adjustment capabilities.

* * * * *